(12) United States Patent
Walker et al.

(10) Patent No.: US 11,736,314 B2
(45) Date of Patent: Aug. 22, 2023

(54) EMISSION REDUCTION DEVICE AND METHOD FOR REDUCING THE EMISSIONS OF A TRANSCEIVER DEVICE FOR A SERIAL BUS SYSTEM

(71) Applicant: Robert Bosch GmbH, Stuttgart (DE)

(72) Inventors: Steffen Walker, Reutlingen (DE); Felix Lang, Reutlingen (DE); Markus Foehrenbach, Rommelsbach (DE); Stefan Palm, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/641,638

(22) PCT Filed: Aug. 24, 2020

(86) PCT No.: PCT/EP2020/073603
§ 371 (c)(1),
(2) Date: May 17, 2022

(87) PCT Pub. No.: WO2021/047895
PCT Pub. Date: Mar. 18, 2021

(65) Prior Publication Data
US 2022/0311638 A1 Sep. 29, 2022

(30) Foreign Application Priority Data
Sep. 11, 2019 (DE) ...................... 10 2019 213 781.4

(51) Int. Cl.
*H04L 12/40* (2006.01)
(52) U.S. Cl.
CPC .................. *H04L 12/40039* (2013.01); *H04L 2012/40215* (2013.01); *H04L 2012/40273* (2013.01)

(58) Field of Classification Search
CPC ..... H04L 12/40039; H04L 2012/40215; H04L 2012/40275
See application file for complete search history.

(56) References Cited

U.S. PATENT DOCUMENTS 9,502,889 B2 * 11/2016 Yang ........................ H04L 43/08
9,606,948 B2 * 3/2017 Monroe ................ G06F 13/364
(Continued)

FOREIGN PATENT DOCUMENTS

| CN | 105684368 A | 6/2016 |
| DE | 102009000697 A1 | 8/2010 |

(Continued)

OTHER PUBLICATIONS

International Search Report for PCT/EP2020/073603 dated Nov. 27, 2020.
ISO 11898-1:2015 Standard, 2015, pp. 1-74.

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

An emission reduction device for a CAN bus system. The device includes an evaluation block for evaluating signals that are transferred differentially on two bus lines, the evaluation block being designed to form the sum voltage of the differentially transferred signals, and a comparison block for comparing the sum voltage in such a way that the difference between the sum voltage for a dominant bus state and the sum voltage for a recessive bus state has a predetermined minimum value, the recessive bus state being overwritable by a dominant bus state. For the comparison, the comparison block is designed to modify at least one property of the transceiver device via a setting in a block of the transceiver device until the difference between the sum (Continued)

voltage for a dominant bus state and the sum voltage for a recessive bus state has the predetermined minimum value.

10 Claims, 6 Drawing Sheets

(56) References Cited

U.S. PATENT DOCUMENTS

| | | | |
|---|---|---|---|
| 9,614,505 B1* | 4/2017 | Cho | G11C 29/028 |
| 10,127,186 B2* | 11/2018 | Walker | H04L 25/0274 |
| 11,061,844 B2* | 7/2021 | de Haas | G06F 13/4027 |
| 11,310,072 B2* | 4/2022 | Broughton | H04L 25/0272 |
| 11,539,548 B2* | 12/2022 | Ou | H04L 12/40013 |
| 2006/0170451 A1* | 8/2006 | Jordanger | H03K 19/00346 |
| | | | 326/34 |
| 2014/0156893 A1* | 6/2014 | Monroe | G06F 13/364 |
| | | | 710/117 |
| 2016/0254926 A1* | 9/2016 | Walker | H04B 1/16 |
| | | | 375/316 |
| 2018/0205572 A1* | 7/2018 | Kishigami | H04L 25/0272 |
| 2019/0058614 A1* | 2/2019 | de Haas | H04L 69/18 |

FOREIGN PATENT DOCUMENTS

| | | |
|---|---|---|
| DE | 102013222789 A1 | 5/2015 |
| DE | 102014204048 A1 | 9/2015 |
| DE | 102017212543 A1 | 1/2019 |

* cited by examiner

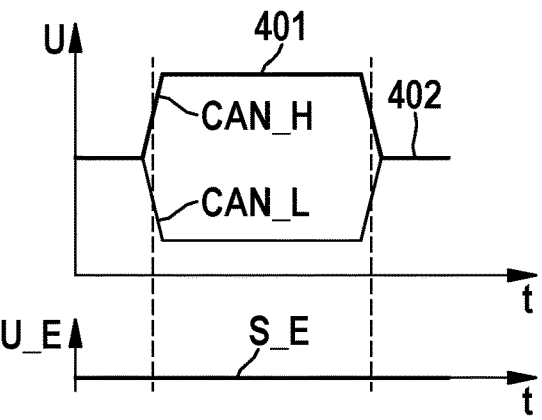
Fig. 3
Fig. 4
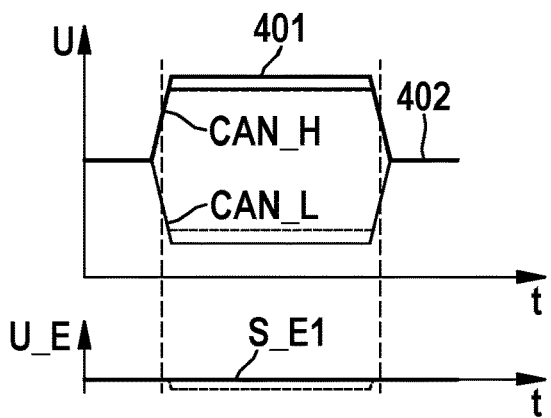
Fig. 5
Fig. 6
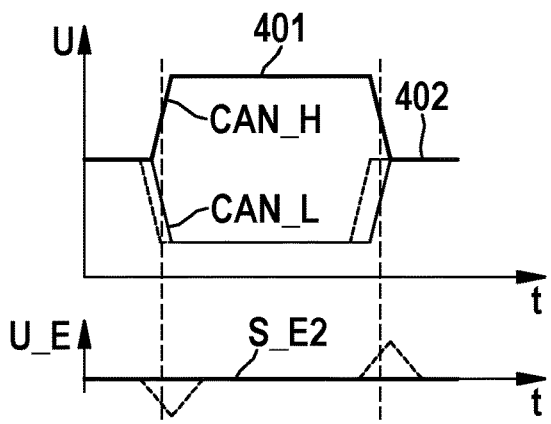
Fig. 7
Fig. 8
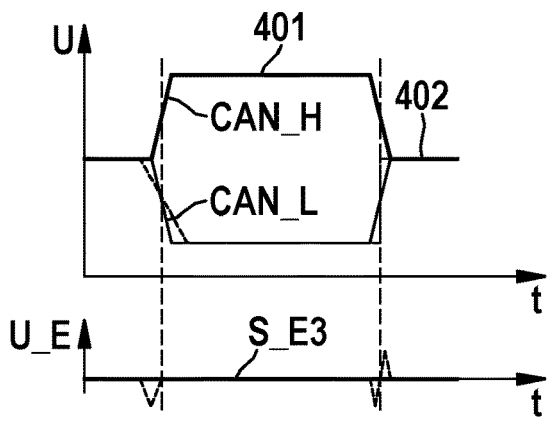
Fig. 9
Fig. 10 ically in a CAN bus system for the individual communication users. The CAN transceivers or CAN FD transceivers must not exceed the limiting values with regard to the line-conducted radiation or emissions for operation in the vehicle. The radiation is assessed by vehicle, control unit, and component measurements accompanying the development, and also by certification measurements based on the IEC 62228 standard, which is required from manufacturers of technical units for a high-quality data transfer in a CAN bus system. The line-conducted electromagnetic compatibility (EMC) radiation from CAN/CAN FD transceivers or transceiver modules, for example in application-specific integrated circuits (ASICs), is measured according to the IEC 61967-4 standard, using the 150-ohm method, and a frequency spectrum is ascertained using a measuring receiver. The transceiver devices (transceivers) are configured in such a way that the envelope of the ascertained frequency spectrum does not exceed a certain limiting value.

EMISSION REDUCTION DEVICE AND METHOD FOR REDUCING THE EMISSIONS OF A TRANSCEIVER DEVICE FOR A SERIAL BUS SYSTEM

FIELD

The present invention relates to an emission reduction device and a method for reducing the emissions of a transceiver device for a serial bus system. The transceiver device is usable in particular in a CAN bus system and/or CAN FD bus system.

BACKGROUND INFORMATION

A CAN bus system is used for message or data transfer in some technical applications. Examples of such technical applications include communication between sensors and control units in a vehicle, or a technical production facility, etc.

In a CAN bus system, messages are transferred with the aid of the CAN protocol and/or CAN FD protocol, as described in the ISO-11898-1:2015 standard as a CAN protocol specification with CAN FD. In a CAN FD bus system, a data transfer rate of greater than 1 Mbit per second (1 Mbps) is possible, for example 2 Mbit/s, 5 Mbit/s, or some other data transmission rate greater than 1 Mbit/s, etc. In addition, a CAN high-speed (HS) bus system is available for which a data transfer rate of up to 500 kbits per second (500 kbps) is possible.

The CAN bus system is a communication system in which for a transmission signal TxD, a signal for a bus signal CAN_H, and ideally at the same time a signal for a bus signal CAN_L, are separately driven onto a bus. One bus state is actively driven in bus signals CAN_H, CAN_L. The other bus state is not driven, and results from a terminating resistor for bus lines or bus wires of the bus. As a result of the differently driven states, in an actual bus system the signal shapes of bus signals CAN_H, CAN_L may deviate from the ideal signal shape. This is due in particular to the bus system design, such as stubs, switching delays of the switching stages for bus signals CAN_H, CAN_L, etc. Such mismatches of the two bus signals CAN_H, CAN_L may result in errors in evaluating the bus signals received from the bus.

For transmitting and receiving the bus signals, transceiver devices, also referred to as CAN transceivers or CAN FD transceivers, etc., are typically used in a CAN bus system for the individual communication users. The CAN transceivers or CAN FD transceivers must not exceed the limiting values with regard to the line-conducted radiation or emissions for operation in the vehicle. The radiation is assessed by vehicle, control unit, and component measurements accompanying the development, and also by certification measurements based on the IEC 62228 standard, which is required from manufacturers of technical units for a high-quality data transfer in a CAN bus system. The line-conducted electromagnetic compatibility (EMC) radiation from CAN/CAN FD transceivers or transceiver modules, for example in application-specific integrated circuits (ASICs), is measured according to the IEC 61967-4 standard, using the 150-ohm method, and a frequency spectrum is ascertained using a measuring receiver. The transceiver devices (transceivers) are configured in such a way that the envelope of the ascertained frequency spectrum does not exceed a certain limiting value.

It is problematic that the level of the radiation or emissions varies, depending on the variation of, for example, the properties of the transmitting transceiver and/or the properties of the receiving transceiver and/or the properties of a common mode choke (CMC) that is used in the measurement. As a result, the described configuration of the transceiver devices (transceivers) is very time-consuming and therefore cost-intensive.

SUMMARY

An object of the present invention is to provide an emission reduction device for reducing the emissions of a transceiver device for a bus system, and a method for reducing emissions of a transceiver device, that solve the above-mentioned problems.

The object may be achieved by an emission reduction device for reducing the emissions of a transceiver device for a serial bus system in accordance with an example embodiment of the present invention. The emission reduction device includes an evaluation block for evaluating signals that are transferred differentially on two bus lines of the bus system, the evaluation block being designed to form the sum voltage of the differentially transferred signals, and a comparison block for comparing the sum voltage, formed by the evaluation block, in such a way that the difference between the sum voltage for a dominant bus state and the sum voltage for a recessive bus state has a predetermined minimum value, the recessive bus state being overwritable by a dominant bus state, for the comparison, the comparison block being designed to modify at least one property of the transceiver device via a setting in a block of the transceiver device until the difference between the sum voltage for a dominant bus state and the sum voltage for a recessive bus state has the predetermined minimum value.

By use of the described emission reduction device, the emissions of the transceiver device may be greatly reduced, and thus improved, without redeveloping the transceiver device (transceiver). As a result, the emissions of the transceiver device are greatly reducible or greatly improvable without additional silicon surface area requirements for components of the transceiver device. The emission reduction device thus allows very cost-effective manufacture of a transceiver device with much lower emissions than previously.

An additional advantage of the described emission reduction device in accordance with the present invention is that lower emission values of the transceiver devices than previously are achievable, regardless of different properties of the individual transceiver devices. The emission reduction device may thus compensate for manufacturing fluctuations in the components of the transceiver device.

Furthermore, the emission reduction device may offer the advantage that previous measures for reducing emissions may be dispensed with. As a result, the semiconductor surface area requirements for new developments of a transceiver device are reduced. In addition, the circuit or the components of the transceiver device may be more imprecise upon use of the comparison via the emission reduction device. This once again allows a reduction in the semiconductor surface area requirements for new developments of the transceiver device.

It is also advantageous that, due to the difference formation of the sum voltages, the comparison method carried out by the described emission reduction device in accordance with the present invention, eliminates the direct voltage component (DC offset) of the measuring technique that is to be taken into account.

Advantageous further embodiments of the emission reduction device are disclosed herein.

In accordance with an example embodiment of the present invention, for the comparison, the comparison block is possibly designed to change, as a property of the transceiver device, a switching delay between the differentially transferred signals for a switching edge from a dominant state to a recessive state of the differentially transferred signals.

Alternatively or additionally, for the comparison, the comparison block may be designed to change, as a property of the transceiver device, a switching delay between the differentially transferred signals for a switching edge from a recessive state to a dominant state of the differentially transferred signals.

Alternatively or additionally, for the comparison, the comparison block may be designed to change, as a property of the transceiver device, the steepness of a switching edge of the transceiver device from a dominant state to a recessive state of the differentially transferred signals.

Alternatively or additionally, for the comparison, the comparison block may be designed to change, as a property of the transceiver device, the steepness of a switching edge from a recessive state to a dominant state of the differentially transferred signals.

Alternatively or additionally, for the comparison, the comparison block may be designed to change, as a property of the transceiver device, a transmission current of the signals for a dominant state of the differentially transferred signals.

Exclusive, collision-free access of a user station to the bus of the bus system may optionally be ensured, at least temporarily, in the bus system.

The emission reduction device described above may be part of a decoupling network for a bus system, the decoupling network also including a measuring shunt and a measuring receiver that is designed to display line-conducted emissions in the spectral range, one end of the measuring shunt being connected to the two bus lines of the bus system and to the measuring receiver.

It is possible for the measuring shunt to have a resistance value in a range from and including 50 ohms (termination for an EMC measurement) to infinity.

Moreover, the above-mentioned object may be achieved by a method for reducing the emissions of a transceiver device for a serial bus system, in accordance with an example embodiment of the present invention. The method is carried out using an emission reduction device and a transceiver device for a bus system. In accordance with an example embodiment of the present invention, the method includes the steps of evaluating, using an evaluation block, signals that are transferred differentially on two bus lines of the bus system, the evaluation block forming the sum voltage of the differentially transferred signals, and comparing, using a comparison block, the sum voltage formed by the evaluation block in such a way that the difference between the sum voltage for a dominant bus state and the sum voltage for a recessive bus state has a predetermined minimum value, the recessive bus state being overwritable by a dominant bus state, for the comparison, the comparison block modifying at least one property of the transceiver device via a setting in a block of the transceiver device until the difference between the sum voltage for a dominant bus state and the sum voltage for a recessive bus state has the predetermined minimum value.

The method in accordance with the present invention provides the same advantages as stated above with regard to the emission reduction device and/or the transceiver device in accordance with the present invention.

Further possible implementations of the present invention also include combinations, not explicitly mentioned, of features or specific embodiments described above or below with regard to the exemplary embodiments. Those skilled in the art will also add individual aspects as enhancements or additions to the particular basic form of the present invention, in view of the disclosure herein.

BRIEF DESCRIPTION OF THE DRAWINGS

The present invention is described in greater detail below with reference to the figures, and based on exemplary embodiments.

FIG. 3 shows the ideal temporal profile of bus signals CAN_H, CAN_L during a change from a recessive bus state to a dominant bus state and back to the recessive bus state in the bus system from FIG. 1.

FIG. 4 shows the ideal temporal profile of an emission signal that results from the temporal profile of the signals from FIG. 3.

FIGS. 5 through 10 show, for the bus system from FIG. 1, three different temporal profiles of bus signals CAN_H, CAN_L during the change from a recessive bus state to a dominant bus state and back to the recessive bus state, and the emission signal that is formed as a result thereof, different mismatches being present in each of FIGS. 5, 7, and 9, so that the temporal profiles of bus signals CAN_H, CAN_L and of the respective associated emission signal deviate from the ideal profiles from FIGS. 3 and 4.

DETAILED DESCRIPTION OF EXAMPLE EMBODIMENTS

Figure 1:
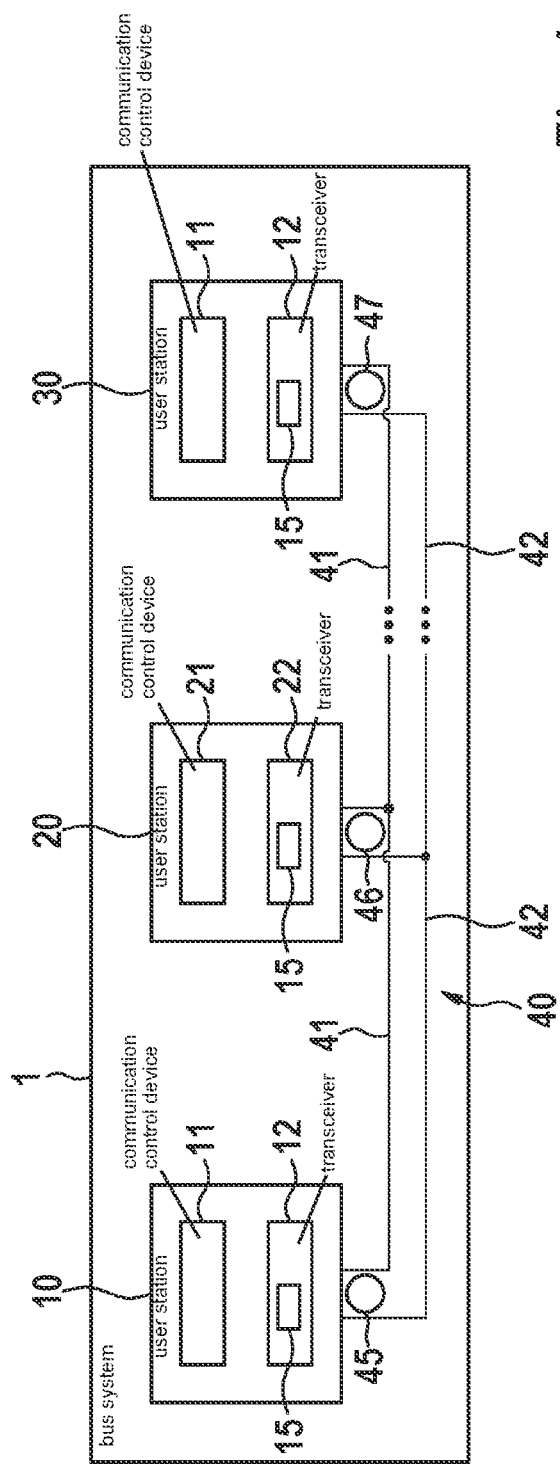
FIG. 1 shows a simplified block diagram of a bus system according to a first exemplary embodiment of the present invention.

FIG. 1 shows a bus system 1 which at least in part may be, for example, a CAN bus system, a CAN FD bus system, etc. Bus system 1 may be used in a vehicle, in particular a motor vehicle, an aircraft, etc., or in a hospital, etc.

In FIG. 1, bus system 1 includes a plurality of user stations 10, 20, 30, each connected to a bus 40 via a first bus line 41 and a second bus line 42. Bus lines 41, 42 may also be referred to as CAN_H and CAN_L, and are used for coupling the dominant levels in the transmission state. Messages 45, 46, 47 in the form of signals may be transferred between individual user stations 10, 20, 30 via bus 40. User stations 10, 20, 30 may be, for example, control units or display devices of a motor vehicle.

As shown in FIG. 1, user stations 10, 30 each include a communication control device 11 and a transceiver device 12. Transceiver devices 12 each include an emission reduction block 15. In contrast, user station 20 includes a communication control device 21 and a transceiver device 22. Transceiver device 22 likewise includes an emission reduction block 15. Transceiver devices 12 of user stations 10, 30 and transceiver device 22 of user station 20 are each directly connected to bus 40, even though this is not illustrated in FIG. 1.

Communication control device 11 is used for controlling a communication of particular user station 10, 20, 30 via bus 40 with another user station of user stations 10, 20, 30 connected to bus 40. Transceiver device 12 is used for transmitting and receiving messages 45, 47 in the form of signals, and uses emission reduction block 15, as described below in greater detail. Communication control device 11 may in particular be designed as a conventional CAN FD controller and/or a CAN controller. Transceiver device 12 may in particular be designed as a conventional CAN transceiver and/or CAN FD transceiver.

Transceiver device 22 is used for transmitting and receiving messages 46 in the form of signals, and uses emission reduction block 15, as described below in greater detail. Otherwise, transceiver device 22 may be designed as a conventional CAN transceiver.

Figure 2:
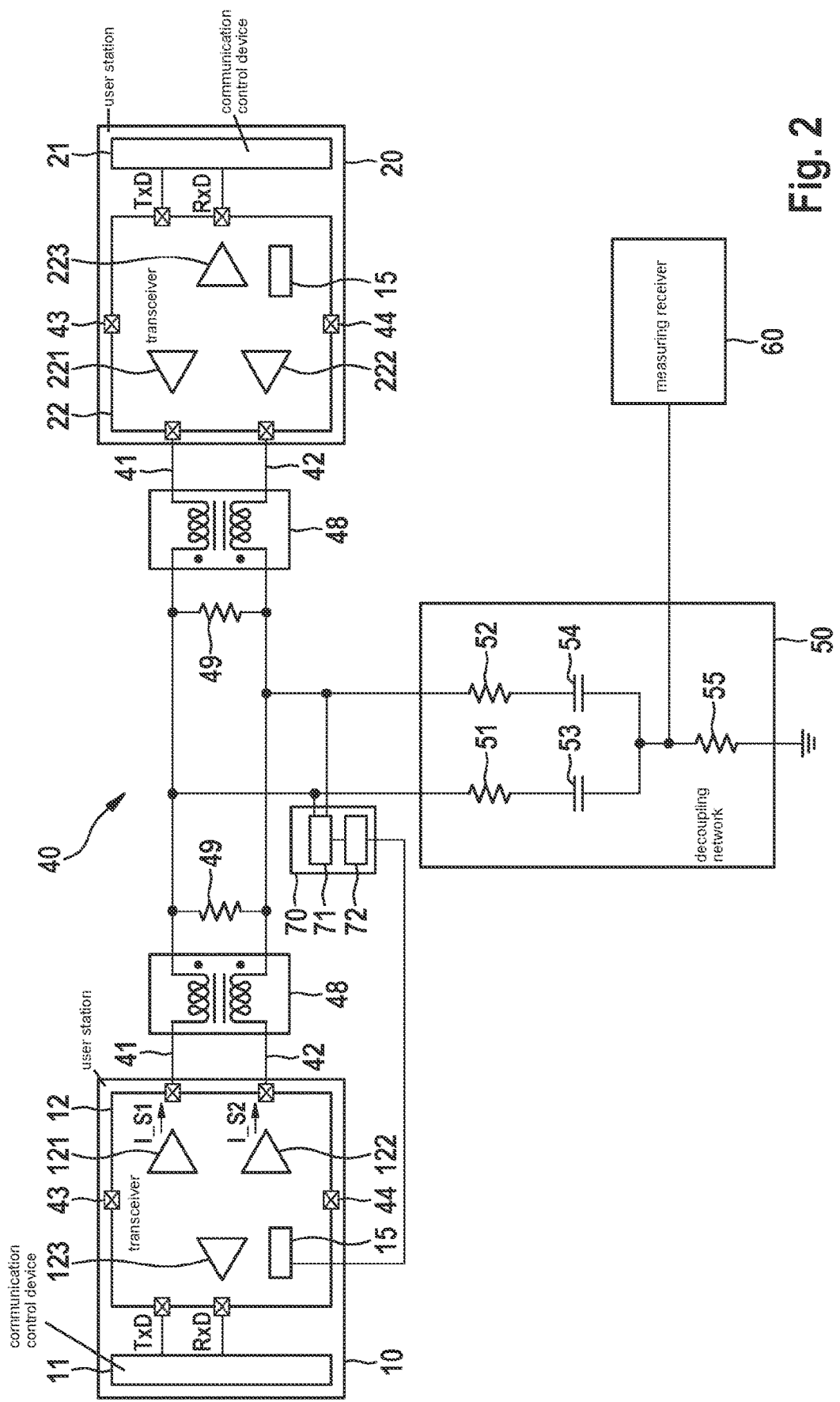
FIG. 2 shows a circuit diagram of a decoupling network for measuring the line-conducted emissions of a transceiver device in the bus system, an emission reduction device according to the first exemplary embodiment of the present invention being provided.

FIG. 2 shows the basic design of a measuring system that includes a decoupling network 50 and a measuring receiver 60 at bus 40, to which two user stations 10, 20 are connected. In addition, an emission reduction device 70 that includes an evaluation module 71 and a comparison module 72 is provided.

Transceiver device 12 of user station 10 includes, in addition to emission reduction block 15, a CAN_H transmission stage 121 for the CAN_H bus signal, a CAN_L transmission stage 122 for the CAN_L bus signal, and a reception block 123. The exact wiring is conventional for conventional transceiver devices, and therefore is not illustrated in greater detail in FIG. 2. Transceiver device 12 is also connected to communication control device 11, on the one hand in order to serially transmit a transmission signal TxD of communication control device 11 to bus lines 41, 42 via transmission stages 121, 122. For this purpose, transceiver device 12 is connected to a power supply via a terminal 43, and to ground via a terminal 44. On the other hand, reception block 123 generates a digital reception signal RxD from the serial signals received from bus lines 41, 42 and transmits it to communication control device 11.

Transceiver device 22 of user station 20 includes, in addition to emission reduction block 15, a CAN_H transmission stage 221 for the CAN_H bus signal, a CAN_L transmission stage 222 for the CAN_L bus signal, and a reception block 223. The exact wiring is conventional in conventional transceiver devices, and therefore is not illustrated in greater detail in FIG. 2. Transceiver device 22 is also connected to communication control device 21, on the one hand in order to transmit a transmission signal TxD of communication control device 21 to bus lines 41, 42 via transmission stages 221, 222. For this purpose, transceiver device 22 is connected to a power supply via a terminal 43, and to ground via a terminal 44. On the other hand, reception block 223 generates a digital reception signal RxD from the signals received from bus lines 41, 42 and transmits it to communication control device 21.

Each user station 10, 20 is connected to bus lines 41, 42 via a common mode choke 48 and a terminating resistor 49. Common mode choke 48 has an inductance of 100 pH, for example. Such an inductance value is typical for automotive applications. Terminating resistor 49 is used for terminating first and second bus lines 41, 42. Terminating resistor 49 has a resistance value of 120 ohms, for example.

In the example from FIG. 2, user station 10 acts as a transmitting user station, and user station 20 acts only as a receiving user station. In addition, user station 10 as a transmitting user station also listens, via its reception block 123, to the communication on bus 40.

Decoupling network 50 includes a first and second resistor 51, 52, a first and second capacitor 53, 54, and a measuring shunt 55. First resistor 51 is connected to bus line 41, and at its other end is connected in series to first capacitor 53. Second resistor 52 is connected to bus line 42, and at its other end is connected in series to second capacitor 54. At their free end the two capacitors 53, 54 are connected to measuring shunt 55. Measuring receiver 60 is connected to the connection between capacitors 53, 54 and measuring shunt 55.

Emission reduction device 70 is provided for configuring emission reduction block 15 of transceiver devices 12, 22. Emission reduction device 70 includes an evaluation block 71 and a comparison block 72.

Evaluation block 71 evaluates differential bus signals CAN_H and CAN_L on bus lines 41, 42. Comparison block 72 treats the evaluation result of the evaluation block according to a predetermined comparison rule in order to minimize the effects of the properties of transmitting user station 10 on the line-conducted emissions. The configuration of emission reduction block 15 of transceiver devices 12, 22 is varied in each case in order to find the setting of transmitting user station 10 for which measuring receiver 60 measures the optimized, in particular lowest, line-conducted emissions.

The operating states of transmitting user station 10 are taken into account according to FIGS. 3 through 10 in varying the properties of transmitting user station 10.

As illustrated in FIG. 3, each of transceiver devices 12, 22 transmits bus signals CAN_H, CAN_L in bus system 1 over time t, ideally without an offset between differential bus signals CAN_H, CAN_L. For this purpose, FIG. 3 shows the transition or change of bus signals CAN_H, CAN_L from a dominant state 401 to a recessive state 402 and back to a dominant state 401.

Dominant state 401 and recessive state 402 make it possible for the conventional CSMA/CR method to be usable, which allows simultaneous access of user stations 10, 20, 30 to bus 40 without destroying higher-priority message 45, 46. It is thus possible to add further bus user stations 10, 20, 30 to bus system 1 in a relatively simple manner, which is very advantageous.

The CSMA/CR method requires recessive states 402 on bus 40, which may be overwritten by other user stations 10, 20, 30 with dominant states 401 on bus 40. In the recessive state, high-impedance conditions prevail at individual user station 10, 20, 30, which in combination with the parasites of the bus wiring result in longer time constants. This results in a limitation of the maximum bit rate of the present-day CAN FD physical layer to approximately 2 megabits per second at the present time during actual vehicle use.

A sender of message 45 starts a transmission of bits of data phase 452 onto bus 40 only after user station 10, as the sender, has won the arbitration, and user station 10, as the sender, thus has exclusive access to bus 40 of bus system 1 for the transmission.

In the ideal case from FIG. 3, transmitting transceiver device 12, 22 causes no emissions over time t. Consequently, resulting emission signal S_E over time t is zero, as illustrated in FIG. 4.

In contrast, FIG. 5 illustrates the case in which, unlike the ideal temporal profile from FIG. 2, an offset is present between transmission current I_S1 of CAN_H transmission stage 121 and transmission current I_S2 of CAN_L transmission stage 122. Thus, the absolute value of transmission current I_S1 of CAN_H stage 121 and the absolute value of transmission current I_S2 of CAN_L stage 122 are different. This results in emissions, as shown in an idealized manner by an emission signal S_E1 in FIG. 6 that results from the temporal profile of bus signals CAN_H, CAN_L from FIG. 5.

Additionally or alternatively, it is possible for an offset as shown in FIG. 7 to occur. For the case in FIG. 7, unlike the ideal temporal profile from FIG. 2, the switching point in time of CAN_H transmission stage 121 and the switching point in time of CAN_L transmission stage 122 are different for the state changes from dominant bus state 401 to recessive bus state 402. In addition, the switching point in time of CAN_H transmission stage 121 and the switching point in time of CAN_L transmission stage 122 are different for the state changes from recessive bus state 402 to dominant bus state 401. This results in emissions, as shown by an emission signal S_E2 in FIG. 8 that results from the temporal profile of bus signals CAN_H, CAN_L from FIG. 7.

Additionally or alternatively, an offset as shown in FIG. 9 may occur. For the case in FIG. 9, unlike the ideal temporal profile from FIG. 2, the edge steepness of CAN_H transmission stage 121 and the edge steepness of CAN_L transmission stage 122 are different for the state changes from dominant bus state 401 to recessive bus state 402. In addition, the edge steepness of CAN_H transmission stage 121 and the edge steepness of CAN_L transmission stage 122 are different for the state changes from recessive bus state 402 to dominant bus state 401. This results in emissions, as shown by an emission signal S_E3 in FIG. 10 that results from the temporal profile of bus signals CAN_H, CAN_L from FIG. 9.

Figure 11:
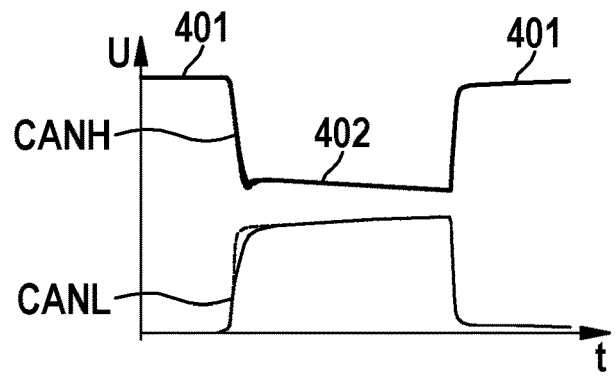
FIG. 11 shows the temporal profile of bus signals CAN_H, CAN_L during the change from a recessive bus state to a dominant bus state and back to the recessive bus state, the switching delay of the CAN_H stage and of the CAN_L stage being varied during the state change.

To optimize the line-conducted emissions for transmitting user station 10, evaluation block 71 from FIG. 2 receives signals CAN_H, CAN_L from bus 40, as shown in FIG. 11 as a special example of a variation of the switching delay according to FIG. 7. In the example from FIG. 11, during the transition from dominant 401 to recessive 402 the two bus signals CAN_H, CAN_L do not behave congruently when the switching delay of CAN_L is varied compared to CAN_H. The term "congruent" is understood to mean mirroring of one of bus signals CAN_H, CAN_L at the horizontal. The switching delay is one configuration option of transceiver device 22 with emission reduction block 15.

Evaluation block 71 evaluates signals CAN_H, CAN_L by forming a sum voltage V_SUM, namely, according to equation (1):

$$V\_SUM = CAN\_H + CAN\_L \tag{1}$$

Figure 12:
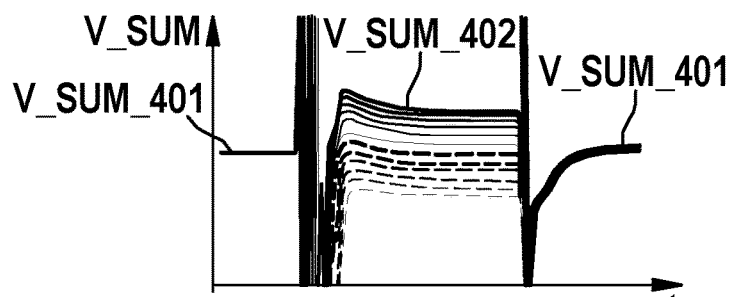
FIG. 12 shows the temporal profile of a sum voltage V_SUM=CAN_H+CAN_L that results from the variation of the signals from FIG. 11.

FIG. 12 shows resulting sum voltage V_SUM of signals CAN_H, CAN_L from FIG. 11. As illustrated in FIG. 12, different sum voltages V_SUM result, depending on the variation of the properties of transmitting user station 10, i.e., the switching delay according to FIG. 7 in this case.

Comparison block 72 carries out a comparison of the evaluation result of evaluation block 71, i.e., the result from equation (1), according to the following comparison rule, namely, $$|V\_SUM\_401 - V\_SUM\_402| \rightarrow \text{minimum} \tag{2}$$

V_SUM_401 is the sum of the bus voltages in dominant state 401, and V_SUM_402 is the sum of the bus voltages in recessive state 402. Thus, according to equation (2), the absolute value of the difference between sums V_SUM_401 and V_SUM_402 is to be a minimum. A large switching error according to FIG. 7 is reflected in a large deviation in sum signal V_SUM between the values for V_SUM_401 and V_SUM_402, i.e., between dominant and recessive.

Measuring shunt 55 may have a resistance value in a range from and including 50 ohms to infinity. The resistance value of 50 ohms corresponds to the termination for an EMC measurement using only decoupling network 50. An infinite resistance value is present when measuring shunt 55 is disconnected.

It is optionally possible to additionally select the resistance value of measuring shunt 55 to be as large as possible, for example in a range of 1.5 kohms to 1 Mohm. The larger the resistance value of measuring shunt 55, the greater is the signal amplitude of V_SUM. The greater the signal amplitude of V_SUM, the more reliably device 70, more precisely, comparison block 72, may find the best comparison value. This is particularly helpful when measuring receiver 60 does not have a sufficiently large bandwidth to detect the switching operation, which lasts approximately 50 ns, and to make an assessment concerning the inequality (switching error) between signals CAN_H, CAN_L.

Comparison block 72 thus changes the configuration of emission reduction block 15 of transceiver devices 12, 22 in each case in order to find the setting of transmitting user station 10 for which measuring receiver 60 measures the optimized, in particular lowest, line-conducted emissions. The result of the comparison is illustrated for a special example in FIG. 13. The variation of the switching delay from CAN_L to CAN_H for 32 different settings is illustrated in the example from FIG. 13. However, generally not all of the 32 settings shown are to be measured, and instead the comparison of comparison block 72 may be ended after reaching a predetermined limiting value. The limiting value may be stored in comparison block 72 or in a separate memory block in device 70. For example, the limiting value is stored in the test program of a series tester.

In general, if the difference of V_SUM_401−V_SUM_402 is a minimum, comparison block 72 ends the comparison, and the desired configuration of emission reduction block 15 is ascertained. Thus, transceiver device 12 may be used in a bus system 1 with the configuration of emission reduction block 15 that is set by device 70.

Figure 14:
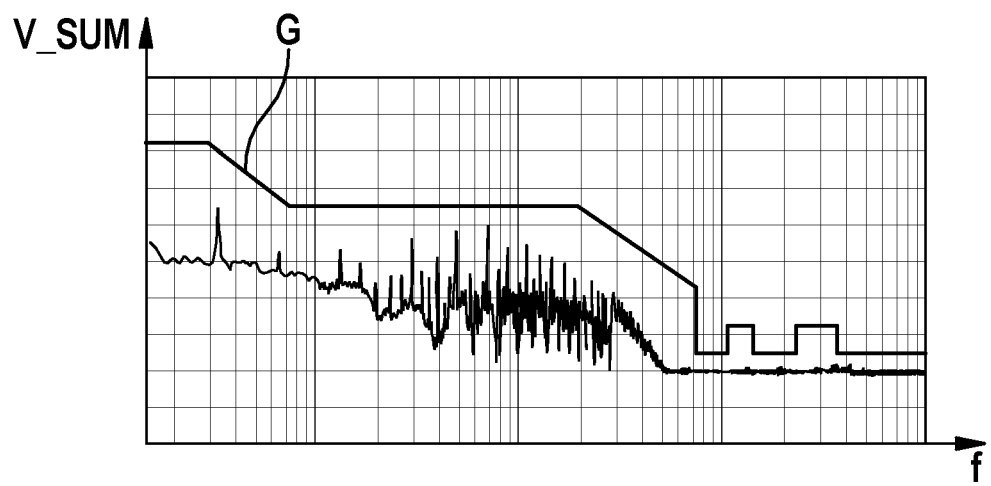
FIG. 14 shows an example of a frequency spectrum of emissions of a transceiver device, which are reduced by use of the emission reduction device in accordance with the present invention.
Figure 15:
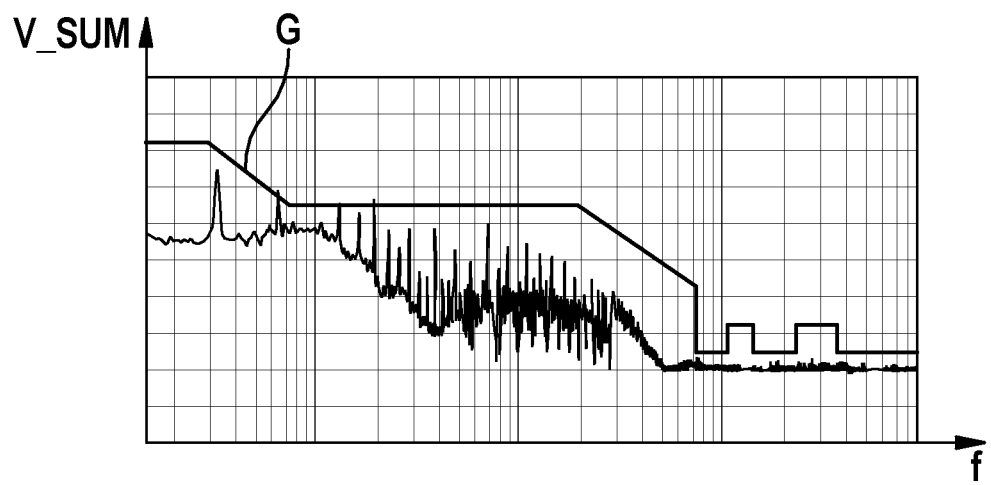
FIG. 15 shows an example of a frequency spectrum of emissions of the transceiver device from FIG. 14 for measurement without use of the emission reduction device.

FIG. 14 shows the result of the emission reduction by use of emission reduction device 70, as a frequency spectrum of frequencies f for the frequency range of 750 kHz to 20 MHz. Thus, for all frequencies in the critical range of 750 kHz to 20 MHz, the emissions are below limiting value G, according to the IEC 62228 standard. In addition, in comparison to the measuring result from FIG. 15, in which emission reduction device 70 was not used, this results in a considerable reduction of the emissions. In the example from FIGS. 14 and 15, it was possible to very greatly reduce the emission results in the critical range of 750 kHz to 20 MHz at three components or three different transceiver devices 12, namely, by 8 dBµV, 11 dBµV, and 15 dBµV. This corresponds to a factor of 2 up to a factor greater than 4. A great improvement in the signal transmission properties of transceiver device 12 has thus been achieved.

Furthermore, by use of device 70 it is not necessary to convert the time range values into the spectral range for each component or transceiver device 12, 22. This is very advantageous, since such a conversion for an evaluation according to FIGS. 14 and 15 requires the recording of a long signal frequency, resulting in a long test period and thus increasing the costs for the emission reduction. For certification according to the IEC 62228 standard, the emission measurement or conversion of the time range values into the spectral range is carried out not at each, but, rather, only for a few, components or transceiver devices 12, 22, for example a few components. In contrast, the above-described emission reduction using device 70, the so-called "comparison using the VSUM method in series," is carried out at each produced component or transceiver device 12, 22.

The method carried out using device 70, as described above, limits the scattering as well as the absolute value of the emissions, and results in a great improvement in the results for the emissions.

According to one modification of the preceding exemplary embodiment, comparison block 72 is designed to carry out the comparison for at least one configuration variable in order to compensate for the signal deviations, described with reference to FIGS. 3 through 10. In particular, comparison block 72 is designed to carry out the comparison for at least one of the comparison variables stated below, namely, in particular for the switching delay between CAN_H and CAN_L for a switching edge from a dominant state 401 to a recessive state 402 in order to compensate for an offset according to FIG. 7, and/or the switching delay between CAN_H and CAN_L for a switching edge from a recessive state 402 to a dominant state 401, and/or the steepness (slew rate) of the switching operation, or the steepness of a switching edge from a dominant state 401 to a recessive state 402, in order to compensate for an offset according to FIG. 7, and/or the steepness (slew rate) of the switching operation, or the steepness of a switching edge from a recessive state 402 to a dominant state 401, in order to compensate for an offset according to FIG. 9, and/or transmission current I_S1, I_S2 of signals CAN_H, CAN_L for a dominant state 401 in order to compensate for an offset according to FIG. 5.

Figure 13:
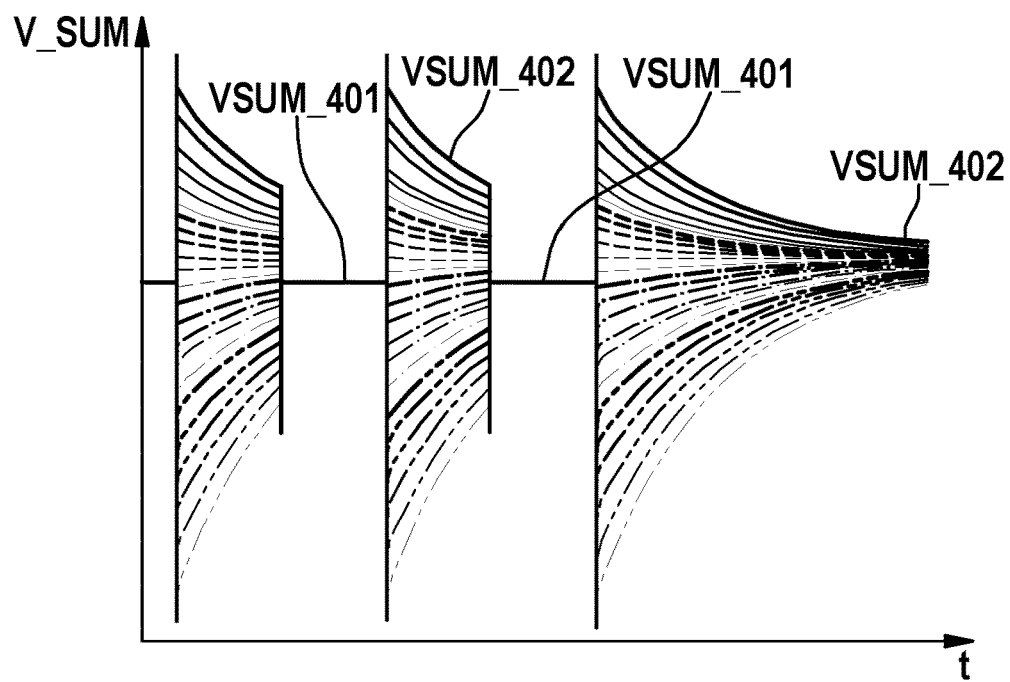
FIG. 13 shows the temporal profile of signals of sum voltage V_SUM at the decoupling network from FIG. 2 when the switching delay is varied from CAN_L to CAN_H for 32 different settings.

In the above-described exemplary embodiment and all its modifications, by use of device 70, the inaccuracy caused by transmitting transceiver device 12, in particular the CAN transceiver, during transmission may be made visible at bus lines 41, 42 with the aid of a large signal amplitude and large time constants. As a result, the inaccuracy during transmission, which causes the undesirable emissions, is measurable in series, as shown in FIG. 13, for example.

According to another modification, device 70 is directly connected to bus lines 41, 42, i.e., not to the connecting lines for decoupling network 50.

Figure 16:
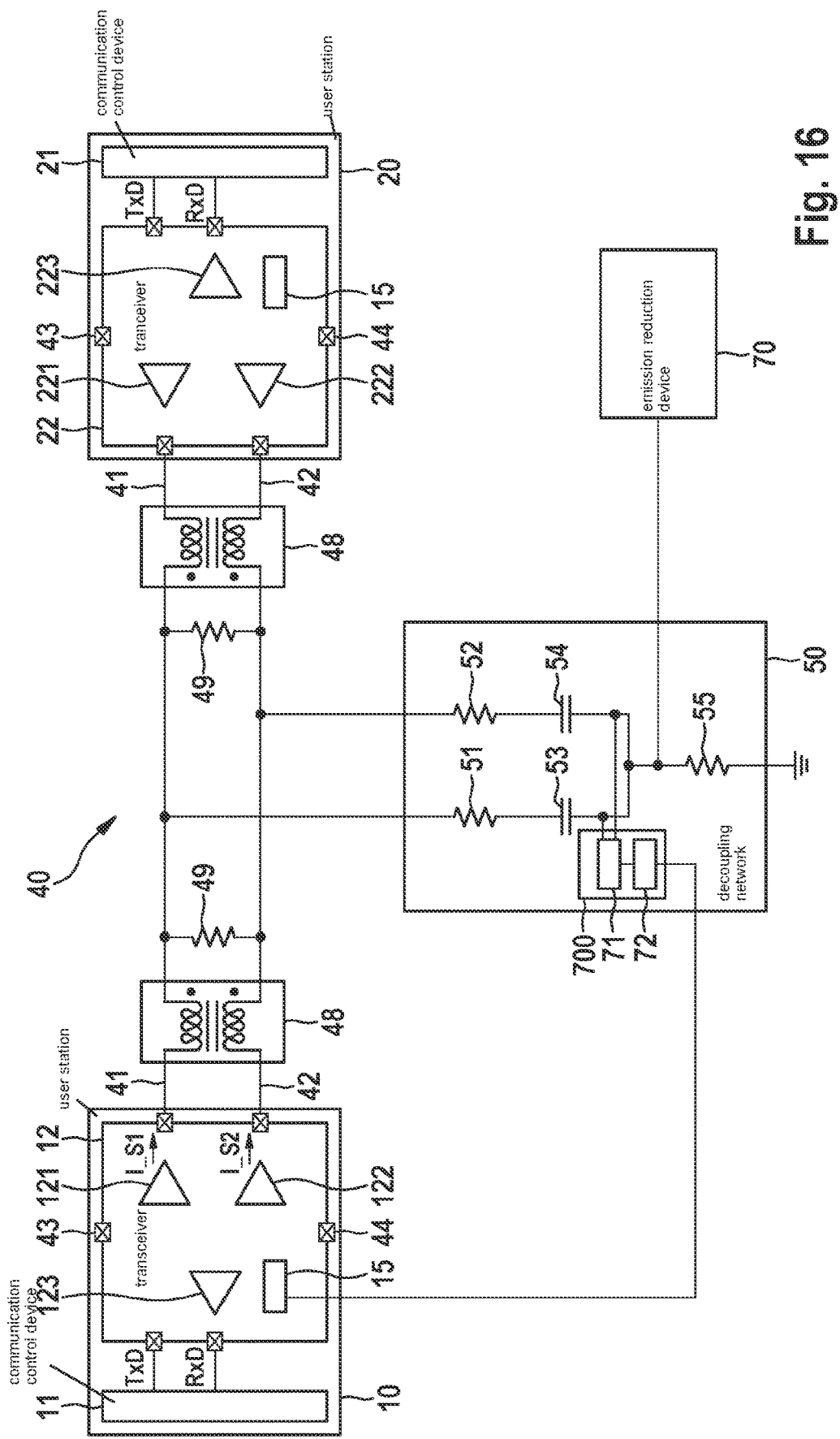
FIG. 16 shows a circuit diagram of a decoupling network for measuring the line-conducted emissions of a transceiver device in the bus system, an emission reduction device according to a second exemplary embodiment of the present invention being provided.

FIG. 16 shows an emission reduction device 700 according to a second exemplary embodiment. Emission reduction device 700 has the same design and the same function as emission reduction device 70 according to the first exemplary embodiment.

However, in contrast to the first exemplary embodiment, emission reduction device 700 according to the present exemplary embodiment is situated in decoupling network 50. More precisely, emission reduction device 700 on the one hand is connected to capacitor 53 of first series connection made up of resistor 51 and capacitor 53. On the other hand, emission reduction device 700 is connected to capacitor 54 of the second series connection made up of resistor 52 and capacitor 54.

Emission reduction device 700 according to the second exemplary embodiment achieves the same advantages as those mentioned with regard to emission reduction device 70 according to the first exemplary embodiment. However, the arrangement of device 700 in FIG. 6 is similar to the certification measuring setup according to the IEC 62228 standard. Device 700 thus measures at the same location as measuring receiver 60 for the certification according to the IEC 62228 standard. Therefore, device 700 also "sees" the same as measuring receiver 60, namely, very small signal amplitudes with high dynamics, as illustrated in FIGS. 4, 6, 8, 10. To enhance the resolution, in addition a specialized evaluation device is to be kept on hand. Therefore, device 700 is clearly inferior to device 70 with regard to the bandwidth in series manufacture of devices 12, 22.

All of the above-described embodiments of emission reduction device 70, 700, of emission reduction block 15, of transceiver devices 12, 22, of user stations 10, 20, 30, of bus system 1, and of the method carried out therein according to the first and second exemplary embodiments and their modifications may be used alone or in any possible combination. In addition, in particular the following modifications are possible.

Above-described bus system 1 according to the first and second exemplary embodiments is described with reference to a bus system based on the CAN protocol. However, bus system 1 according to the first and/or second exemplary embodiment may also be some other type of communications network. It is advantageous, but not necessarily a requirement, that for bus system 1, exclusive, collision-free access to bus 40 by a user station 10, 20, 30 is ensured, at least for certain time periods.

Bus system 1 according to the first and/or second exemplary embodiment and modifications thereof is in particular a CAN bus system or a CAN HS bus system or a CAN FD SIC bus system or a CAN XL bus system. The bus system or a CAN FD bus system or a CAN FD SIC bus system or a CAN XL bus system. However, bus system 1 may also be some other serial communications network.

The functionality of the exemplary embodiments described above is thus usable, for example, for transceiver devices 12, 22 that are operable in a CAN bus system or a CAN HS bus system or a CAN FD SIC bus system or a CAN XL bus system.

In addition, the functionality of the exemplary embodiments described above is usable for other differential interfaces, for example LVDS, FlexRay, etc.

It is possible that for the two bus states, no dominant or recessive bus state is used, at least temporarily, and instead a first bus state and a second bus state that are both driven are used. A CAN XL bus system is an example of such a bus system.

The number and arrangement of user stations 10, 20, 30 in bus system 1 according to the first and second exemplary embodiments and their modifications is arbitrary. In particular, it is possible for only user stations 10 or user stations 20 or user stations 30 to be present in bus systems 1 in the first or second exemplary embodiment. Notwithstanding, it is also possible for only emission reduction blocks 15 according to the various embodiment variants described above to be present.

What is claimed is:

1. An emission reduction device for reducing emissions of a transceiver device for a serial bus system, comprising:
    an evaluation block configured to evaluate signals that are transferred differentially on two bus lines of the bus system, the evaluation block being configured to form a sum voltage of the differentially transferred signals; and
    a comparison block configured to compare the sum voltage, formed by the evaluation block, in such a way that a difference between the sum voltage for a dominant bus state and a sum voltage for a recessive bus state has a predetermined minimum value, the recessive bus state being overwritable by a dominant bus state; for the comparison, the comparison block configured to modify at least one property of the transceiver device via a setting in a block of the transceiver device until the difference between the sum voltage for the dominant bus state and the sum voltage for the recessive bus state has the predetermined minimum value.

2. The emission reduction device as recited in claim 1, wherein for the comparison, the comparison block is configured to change, as a property of the transceiver device, a switching delay between the differentially transferred signals for a switching edge from a dominant state to a recessive state of the differentially transferred signals.

3. The emission reduction device as recited in claim 1, wherein for the comparison, the comparison block is configured to change, as a property of the transceiver device, a switching delay of the transceiver device between the differentially transferred signals for a switching edge from a recessive state to a dominant state of the differentially transferred signals.

4. The emission reduction device as recited in claim 1, wherein for the comparison, the comparison block is configured to change, as a property of the transceiver device, a steepness of a switching edge of the transceiver device from a dominant state to a recessive state of the differentially transferred signals.

5. The emission reduction device as recited in claim 1, wherein for the comparison, the comparison block is configured to change, as a property of the transceiver device, a steepness of a switching edge from a recessive state to a dominant state of the differentially transferred signals.

6. The emission reduction device as recited in claim 1, wherein for the comparison, the comparison block is configured to change, as a property of the transceiver device, a transmission current of signals for a dominant state of the differentially transferred signals.

7. The emission reduction device as recited in claim 1, wherein exclusive, collision-free access to the bus of the bus system by a user station is at least temporarily ensured in the bus system.

8. A decoupling network for a bus system, comprising:
    an emission reduction device for reducing emissions of a transceiver device for a serial bus system, including:
        an evaluation block configured to evaluate signals that are transferred differentially on two bus lines of the bus system, the evaluation block being configured to form a sum voltage of the differentially transferred signals, and
        a comparison block configured to compare the sum voltage, formed by the evaluation block, in such a way that a difference between the sum voltage for a dominant bus state and a sum voltage for a recessive bus state has a predetermined minimum value, the recessive bus state being overwritable by a dominant bus state;
        for the comparison, the comparison block configured to modify at least one property of the transceiver device via a setting in a block of the transceiver device until the difference between the sum voltage for the dominant bus state and the sum voltage for the recessive bus state has the predetermined minimum value;
    a measuring shunt; and
    a measuring receiver configured to display line-conducted emissions in a spectral range, wherein one end of the measuring shunt is connected to the two bus lines of the bus system and to the measuring receiver.

9. The decoupling network as recited in claim 8, wherein the measuring shunt has a resistance value in a range from and including 50 ohms to infinity.

10. A method for reducing emissions of a transceiver device for a serial bus system, the method being carried out using an emission reduction device and a transceiver device for a bus system, the method comprising the following steps:
    evaluating, using an evaluation block, signals that are transferred differentially on two bus lines of the bus system, the evaluation block forming a sum voltage of the differentially transferred signals; and
    comparing, using a comparison block, the sum voltage formed by the evaluation block in such a way that a difference between a sum voltage for a dominant bus state and a sum voltage for a recessive bus state has a predetermined minimum value, the recessive bus state being overwritable by the dominant bus state, for the comparison, the comparison block modifying at least one property of the transceiver device via a setting in a block of the transceiver device until the difference between the sum voltage for the dominant bus state and the sum voltage for the recessive bus state has the predetermined minimum value.

* * * * *